(12) United States Patent
Seo et al.

(10) Patent No.: US 11,332,111 B2
(45) Date of Patent: May 17, 2022

(54) SYSTEM FOR AND METHOD OF CONTROLLING DRIVING OF AN ELECTRONIC VACUUM PUMP

(71) Applicants: HYUNDAI MOTOR COMPANY, Seoul (KR); KIA MOTORS CORPORATION, Seoul (KR)

(72) Inventors: Woo Pyeong Seo, Gwangmyeong-si (KR); Il Young Chang, Seoul (KR); Eun Bae Koh, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 41 days.

(21) Appl. No.: 16/880,461

(22) Filed: May 21, 2020

(65) Prior Publication Data

US 2021/0162970 A1    Jun. 3, 2021

(30) Foreign Application Priority Data

Nov. 28, 2019  (KR) .......................... 10-2019-0155456

(51) Int. Cl.
| | |
|---|---|
| *B60T 13/20* | (2006.01) |
| *B60T 13/72* | (2006.01) |
| *B60T 13/52* | (2006.01) |
| *B60T 13/18* | (2006.01) |
| *B60T 8/171* | (2006.01) |
| *B60T 8/32* | (2006.01) |

(Continued)

(52) U.S. Cl.
CPC .............. *B60T 13/20* (2013.01); *B60T 8/171* (2013.01); *B60T 8/329* (2013.01); *B60T 13/161* (2013.01); *B60T 13/18* (2013.01); *B60T 13/52* (2013.01); *B60T 13/565* (2013.01); *B60T 13/72* (2013.01); *B60T 13/46* (2013.01); *B60T 2250/04* (2013.01); *B60Y 2200/91* (2013.01)

(58) Field of Classification Search
CPC ........ B60T 13/52; B60T 13/72; B60T 13/565; B60T 13/161; B60T 13/18; B60T 13/20; B60T 8/171
USPC ............................... 303/114.3; 188/356, 357
See application file for complete search history.

(56) References Cited

U.S. PATENT DOCUMENTS

| | | | |
|---|---|---|---|
| 4,738,112 A * | 4/1988 | Nomura ................... | B60T 17/02 303/12 |
| 7,909,413 B2 * | 3/2011 | Schonlau ................ | B60T 17/02 303/12 |

(Continued)

FOREIGN PATENT DOCUMENTS

| | | | |
|---|---|---|---|
| CN | 110435617 A | * | 11/2019 |
| CN | 110466491 A | * | 11/2019 |

(Continued)

*Primary Examiner* — Thomas J Williams
(74) *Attorney, Agent, or Firm* — Lempia Summerfield Katz LLC (57) ABSTRACT

A system for and a method of controlling driving of a continuously-operable electronic vacuum pump includes determining conditions for allowing and disallowing first and second electronic vacuum pumps to operate for each braking situation according to vehicle state information associated with braking. The first and second electronic vacuum pumps are driven individually or concurrently according to the determined braking situation. Thus, an optimal negative pressure optimal suitable for the vehicle state information is easily supplied to a booster.

17 Claims, 6 Drawing Sheets

(51) Int. Cl.
*B60T 13/16* (2006.01)
*B60T 13/565* (2006.01)
*B60T 13/46* (2006.01)

(56) References Cited

U.S. PATENT DOCUMENTS

| | | | |
|---|---|---|---|
| 2005/0000769 A1* | 1/2005 | Hawener | B60T 17/02 188/356 |
| 2008/0309155 A1 | 12/2008 | Audrezet | |
| 2010/0280723 A1* | 11/2010 | Epple | B60T 13/52 701/70 |
| 2014/0188359 A1* | 7/2014 | Chen | B60T 13/52 701/70 |
| 2017/0088108 A1 | 3/2017 | Sekiya | |

FOREIGN PATENT DOCUMENTS

| | | | |
|---|---|---|---|
| FR | 2459390 A1 * | 1/1981 | ............. B60T 15/50 |
| JP | 2017065334 A | 4/2017 | |
| KR | 20110078347 A | 7/2011 | |
| KR | 101665928 B1 | 10/2016 | |
| KR | 101923366 B1 | 11/2018 | |

* cited by examiner

FIG. 1

— Hydraulic Pressure
— Electrical signal
---- Vacuum Pressure

FIG. 2

— Hydraulic Pressure
— Electrical signal
---- Vacuum Pressure

SYSTEM FOR AND METHOD OF CONTROLLING DRIVING OF AN ELECTRONIC VACUUM PUMP

CROSS REFERENCE TO RELATED APPLICATION

The present application claims priority to Korean Patent Application No. 10-2019-0155456, filed Nov. 28, 2019, the entire contents of which are incorporated herein for all purposes by this reference.

BACKGROUND

Field of the Disclosure

The present disclosure relates to a system for and a method of controlling driving of an electronic vacuum pump. More particularly, the present disclosure relates to a system for and a method of controlling driving of an electronic vacuum pump. Both the system and the method are capable of achieving improvements in durability performance and braking performance of a continuously-operating vacuum pump that may be applied in braking systems for an electric vehicle.

Description of the Related Art

Generally, a hydraulic braking system for producing a brake force using a hydraulic pressure generated by operating a brake pedal may be applied in internal combustion engine vehicles.

Figure 1:
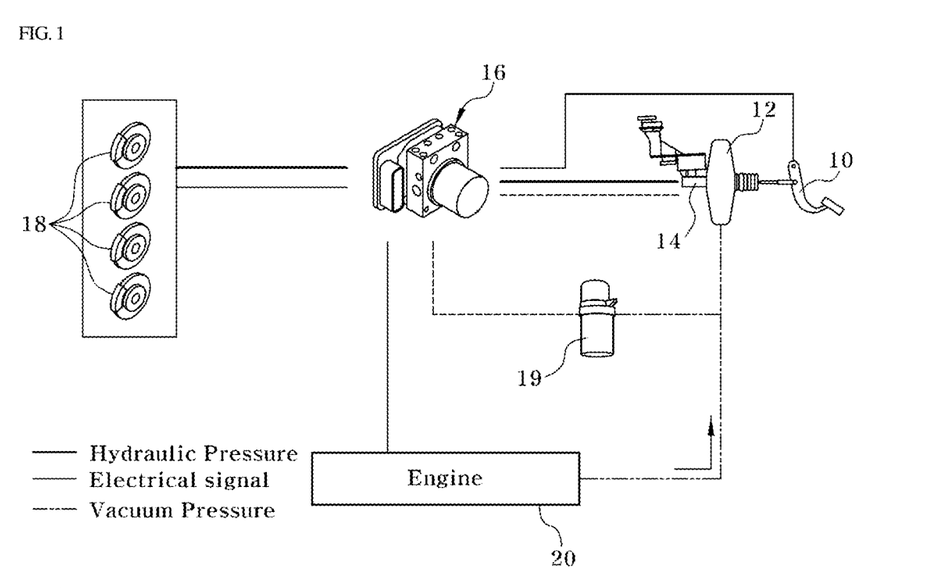
FIG. 1 is a diagram illustrating a configuration of a braking system of an internal combustion engine vehicle.

With reference to FIG. 1, the hydraulic braking system is configured to include a booster 12 that forms a pressure difference between an atmospheric pressure and a vacuum pressure according to an amount of operation of a brake pedal 10, a master cylinder 14 that operates with a force exerted by the booster 12, a controller 16 that appropriately distributes a hydraulic pressure generated from the master cylinder 14 to a hydraulic braking unit 18 (for example, a braking wheel cylinder) mounted on each wheel, and an auxiliary vacuum pump 19 that is driven with a control signal of the controller 16, and the like.

At this time, the booster 12 operates with an engine negative pressure that is provided from an engine 20.

When the engine negative pressure that is provided to the booster 12 is equal to or less than a reference value, the controller 16 can perform control to drive the auxiliary vacuum pump 19, and thus can provide a negative pressure that makes up for a shortage of the negative pressure that is caused by operating the auxiliary vacuum pump 19 to the booster 12.

In this manner, the auxiliary vacuum pump 19 mounted in the internal combustion vehicle including an engine operates only in a case where the engine negative pressure is insufficient, and subsidiarily provides the negative pressure to the booster 12.

On the other hand, an electric vehicle is not equipped with an engine and travels by driving a motor. Therefore, a continuously-operating type vacuum pump is necessary to provide the negative pressure to the booster.

However, the auxiliary vacuum pump applied in the internal combustion engine vehicles provides poor durability performance and thus cannot be used as a continuously-operating type vacuum pump for the electric vehicle.

More specifically, the controller operates the auxiliary vacuum pump by performing control that turns on and off a relay, but this relay provides poor durability performance. Because of this, the auxiliary vacuum pump cannot be used as the continuously-operating type vacuum pump for the electric vehicle.

In addition, the auxiliary vacuum pump operates to subsidiarily provide the negative pressure in a case where the engine negative pressure is insufficient, and this provides the disadvantage that the negative pressure required by the booster applied in electric vehicles cannot be sufficiently provided.

SUMMARY

An objective of the present disclosure, which is made to solve the above-described problems in the related art, is to provide a system for and a method of controlling driving of a continuously-operable electronic vacuum pump. In both of the system and the method, conditions for allowing and disallowing first and second electronic vacuum pumps to operate are determined for each braking situation according to vehicle state information associated with braking. The first and second electronic vacuum pumps are driven individually or concurrently according to the determined braking situation, and thus an optimal negative pressure suitable for the vehicle state information is easily supplied to a booster.

According to an aspect of the present disclosure, a system is provided for controlling driving of an electronic vacuum pump. The system includes: a first electronic vacuum pump and a second electronic vacuum pump, each providing a negative pressure to a booster when an electric vehicle brakes; and an electronic vacuum pump (EVP) controller that performs control, which alternately or concurrently drives the first electronic vacuum pump and the second electronic vacuum pump on the basis of signals of sensors that sense pieces of information associated with vehicle starting and braking.

According to another aspect of the present disclosure, a method of control driving of an electronic vacuum pump is provided. The method includes: providing signals of sensors, each sensing information associated with starting and braking of an electric vehicle, to an EVP controller; causing the EVP controller to determine conditions for allowing and disallowing a first electric vacuum pump and a second electric vacuum pump, each providing a negative pressure to a booster, to operate, on the basis of sensing signals of the sensors; and causing the EVP controller to perform control that, according to the determined conditions, applies an alternately-driving signal for alternate driving of the first electric vacuum pump and the second electric vacuum pump or applies a concurrently-driving signal for concurrent driving of the first electric vacuum pump and the second electric vacuum pump.

The system for and the method of control driving of an electronic vacuum pump according to the present disclosure provide the following advantages.

First, the first electronic vacuum pump and the second electronic vacuum pump are employed to supply the negative pressure to the booster. Thus, with alternate driving control that operates the first electronic vacuum pump and then operates the second electronic vacuum pump, a time for cooling each electronic vacuum pump can be secured. Accordingly, improvement in the durability and maintenance performance of each electronic vacuum pump can be achieved.

Second, the first electronic vacuum pump and the second electronic vacuum pump are employed to supply a negative pressure to the booster. Thus, each electronic vacuum pump can be reduced to a more compact size. Accordingly, noise due to the operation of the electronic vacuum pump can be reduced, and thus performance in terms of noise, vibration, and harshness (NVH) of the vehicle can be improved.

Third, for stable braking when rapid deceleration and sudden braking occur, the first electronic vacuum pump and the second electronic vacuum pump are controlled to operate concurrently. Thus, performance in terms of replenishing the booster with the negative pressure can be improved. Accordingly, braking performance can be improved.

Fourth, the first electronic vacuum pump and the second electronic vacuum pump are reduced in size. Thus, advantages such as cost saving, weight reduction, and low power consumption can be archived.

DETAILED DESCRIPTION OF THE DISCLOSURE

Embodiments of the present disclosure are described in detail below with reference to the accompanying drawings.

When a component, device, or element of the present disclosure is described as having a purpose or performing an operation, function, or the like, the component, device, or element should be considered herein as being "configured to" meet that purpose or to perform that operation, function, or the like. Further, a controller described herein may include a processor programmed to perform the noted operation, function, operation, or the like.

Figure 2:
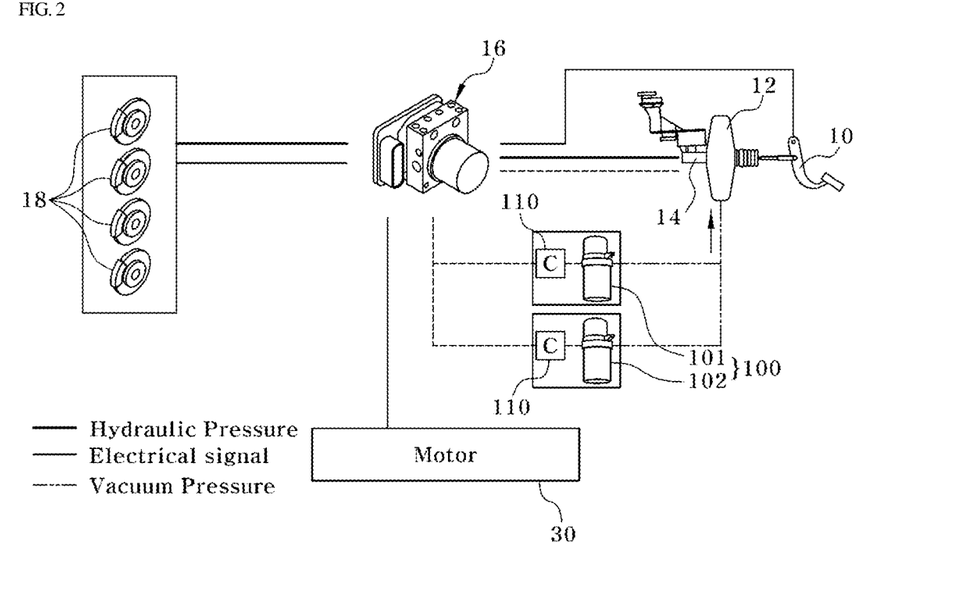
FIG. 2 illustrates a braking system of an electric vehicle including a system for controlling driving of an electronic vacuum pump (EVP) according to the present disclosure.
Figure 3:
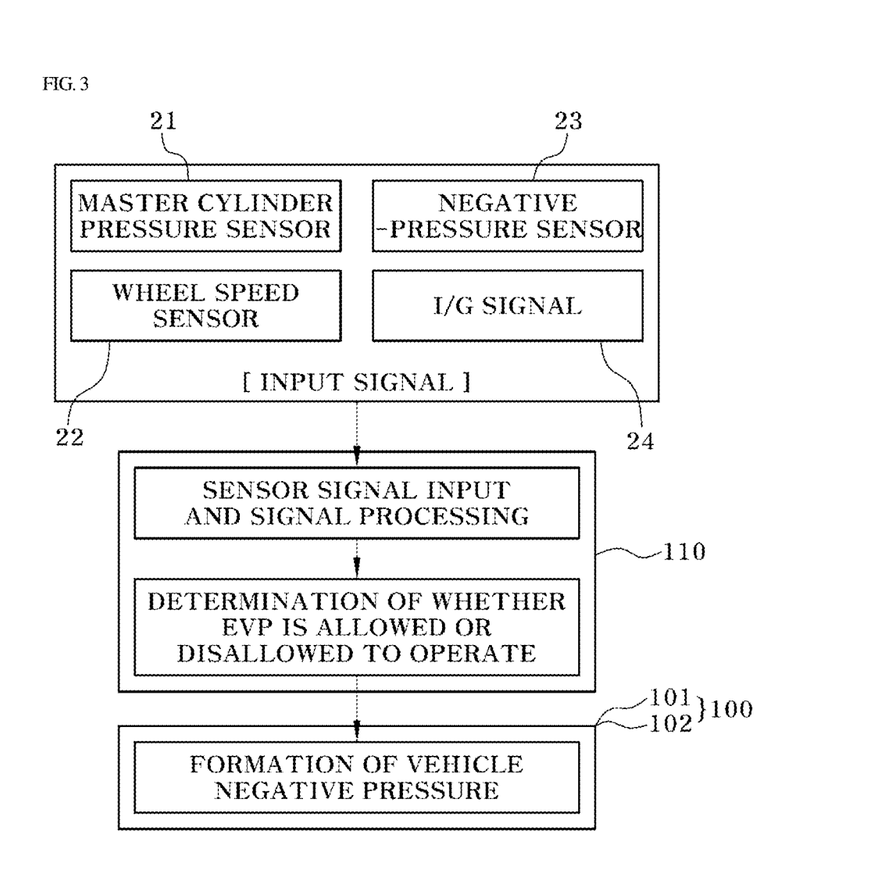
FIG. 3 is a configuration diagram for controlling the system for controlling driving of an electronic vacuum pump according to the present disclosure.
Figure 4:
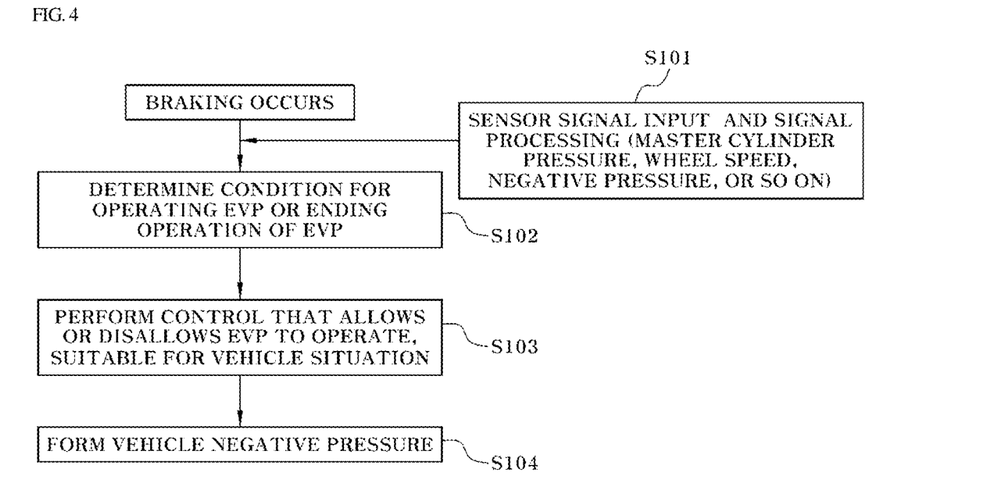
FIG. 4 is a flowchart illustrating a method of controlling the driving of the electronic vacuum pump according to the present disclosure.

FIG. 2 illustrates an entire braking system of an electric vehicle including a system for controlling driving of an electronic vacuum pump (EVP) according to the present disclosure. FIG. 3 is a configuration diagram for controlling the system for controlling driving of an electronic vacuum pump according to the present disclosure. FIG. 4 is a flowchart illustrating a method of controlling driving of an electronic vacuum pump according to the present disclosure.

As illustrated in FIG. 2, a braking system for an electric vehicle according to the present disclosure is configured to include a booster 12 that forms a pressure difference between an atmospheric pressure and a vacuum pressure according to an amount of operation of a brake pedal 10, a master cylinder 14 that operates with a force that is exerted by the booster 12, a controller 16 that appropriately distributes a hydraulic pressure generated from the master cylinder 14 to a hydraulic braking unit 18 (for example, a braking wheel cylinder) mounted on each wheel, a continuously-operating type electronic vacuum pump 100 that operates with a control signal of the controller 16, and so on. Moreover, the braking system is configured to further include an EVP controller 110 to control turn-on and turn-off of a first electronic vacuum pump 101 and a second electronic vacuum pump 102 that are the continuously-operating type electronic vacuum pumps 100.

In this embodiment, the electronic vacuum pump 100, as illustrated in FIG. 2, may be configured with the first electronic vacuum pump 101 and the second electronic vacuum pump 102 that continuously operate to provide a negative pressure to the booster 12 when the electric vehicle traveling by driving the motor 30 brakes, in an alternate or a concurrent manner.

Accordingly, when the electric vehicle brakes, the booster 12 operates with a negative pressure that is provided from the first electronic vacuum pump 101 and the second electronic vacuum pump 102.

The EVP controller 110 determines conditions for allowing and disallowing the first and second electronic vacuum pumps 101 and 102 to operate, on the basis of sensing signals of sensors that sense pieces of information associated with starting and braking of a vehicle, and performs control to apply an alternately-driving signal or a concurrently-driving signal to the first and second electronic vacuum pumps 101 and 102 according to the determined conditions.

To this end, as illustrated in FIG. 3, the sensors sense or detect the pieces of information associated with the starting and braking of the vehicle and transfer the sensed or detected pieces of information to the EVP controller 110. The sensors may be configured to include a pressure sensor 21 that senses an operating pressure (for example, a hydraulic pressure that is to be supplied to the hydraulic braking unit 18 of each wheel) of the master cylinder 14, a wheel speed sensor 22 that detects a vehicle speed, a negative-pressure sensor 23 that senses a negative pressure provided to the booster 12, and an I/G (ignition) signal providing unit 24 that provides an ignition signal when the vehicle starts.

Therefore, as illustrated in FIG. 4, the EVP controller 110 receives a current operating pressure signal of the master cylinder 14 sensed by the pressure sensor 21, vehicle speed information detected by the wheel speed sensor 22, a negative-pressure signal sensed by the negative-pressure sensor 23, and a vehicle starting switch-on/off signal of the I/G signal providing unit 24 (S101). The EVP controller 110 determines the conditions for allowing and disallowing the first and second electronic vacuum pumps 101 and 102 to operate, for each braking and traveling situation (S102). The EVP controller 110 then performs control that applies an alternately-driving signal or a concurrently-driving signal to the first and second electronic vacuum pumps 101 and 102 according to the determined braking and traveling situation (S103).

More specifically, the EVP controller 110 categorizes the conditions for allowing and disallowing the first and second electronic vacuum pumps 101 and 102 to operate, for each braking and traveling situation (a vehicle starting switch-on (I/G on) situation, a rapid-deceleration and sudden-braking situation, a low negative-pressure situation, a vehicle speed situation, or the like). The categorization is based on the current operating pressure signal of the master cylinder 14 sensed by the pressure sensor 21, the vehicle speed information detected by the wheel speed sensor 22, the negative-pressure signal sensed by the negative-pressure sensor 23, and the vehicle starting switch-on/off signal of the I/G signal providing unit 24. The EVP controller performs the control to apply the alternately-driving signal or the concurrently-driving signal to the first and second electronic vacuum pumps 101 and 102.

Accordingly, revolutions per minute (RPM) at which the first and second electronic vacuum pumps 101 and 102 operate are adjusted according to each braking and traveling situation (the vehicle starting switch-on (I/G on) situation, the rapid-deceleration and sudden-braking situation, the low negative-pressure situation, the vehicle speed situation, the vehicle speed situation, or the like). Accordingly, the first and second electronic vacuum pumps 101 and 102 are driven alternately or concurrently, and thus, an optimal negative pressure necessary for the booster 12 is generated according to each braking and traveling situation (S104).

A control example where the first and second electronic vacuum pumps 101 and 102 are driven according to each braking and traveling situation is described here according to each embodiment.

The first and second electronic vacuum pumps 101 and 102 operate alternately with an alternation control signal of the EVP controller 110 in a basic situation and operate concurrently with a concurrent control signal of the EVP controller 110 when the vehicle starting switch-on situation, the rapid-deceleration and sudden-braking situation, or the low negative-pressure situation occurs.

Example of Controlling the Alternate Driving of the First and Second Electronic Vacuum Pumps The first and second electronic vacuum pumps 101 and 102 operate alternately with the alternation control signal of the EVP controller 110 in a basic vehicle traveling and braking situation (for example, when normal braking other than sudden braking occurs while the vehicle travels at a cruising speed) other than the vehicle starting switch-on situation, the rapid-deceleration and sudden-braking situation, the low negative-pressure situation, or the like.

To this end, the EVP controller 110 is configured to apply the alternation control signal for alternate driving to the first and second electronic vacuum pumps 101 and 102 in the basic vehicle traveling and braking situation other than the vehicle starting switch-on situation, the rapid-deceleration and sudden-braking situation, the low negative-pressure situation, or the like.

In other words, the EVP controller 110 is configured to perform control for alternately operating the electronic vacuum pumps 101 and 102 in such a manner that each of the electronic vacuum pumps 101 and 102 generates the optimal negative pressure within a preset maximum operating time.

Therefore, while the vehicle travels after a vehicle starting switch is on, the first electronic vacuum pump 101 first operates with the alternation control signal of the EVP controller 110. Thereafter, when a desired negative pressure is not generated within a maximum time for the first electronic vacuum pump 101 to operate, the first electronic vacuum pump 101 is disallowed to operate while the second electronic vacuum pump 102 is allowed to operate.

In an experimental example, the first and second electronic vacuum pumps 101 and 102 were caused to alternately operate with the alternation control signal of the EVP controller 110, and thus the degree to which a negative pressure was generated was measured. As shown in a graph for measurement in FIG. 5, a negative pressure was generated when the first electronic vacuum pump 101 operated and a negative pressure was generated when the second electronic vacuum pump 102 satisfied a reference negative pressure.

Figure 5:
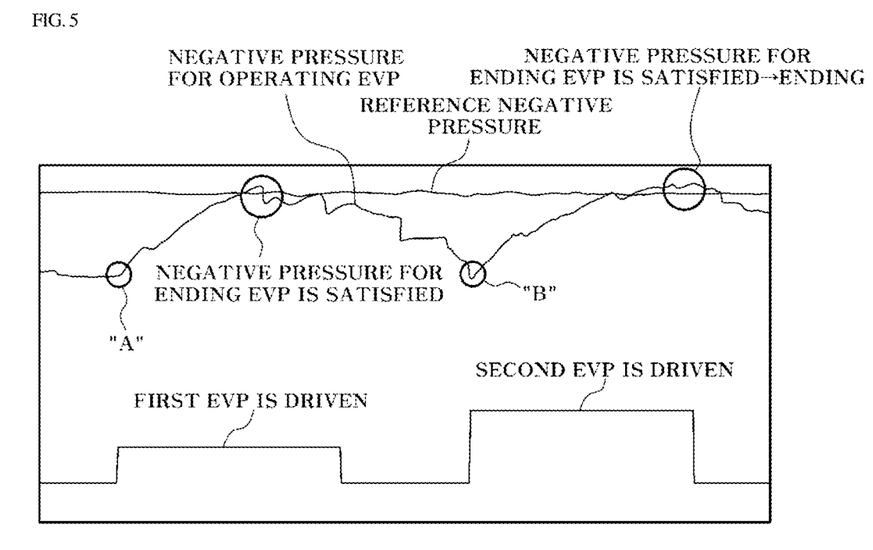
FIGS. 5-10 are graphs that illustrate examples of controlling the electronic vacuum pump according to embodiments, respectively, of the present disclosure.

In other words, as indicated by A in FIG. 5, if the negative pressure that is generated when the EVP operates drops below the reference negative pressure, the first electronic vacuum pump 101 is caused to operate. Furthermore, when the reference negative pressure is satisfied within the maximum time for the first electronic vacuum pump 101 to operate, the first electronic vacuum pump 101 is disallowed to operate. Subsequently, as indicated by B in FIG. 5, if the negative pressure that is generated when the EVP operates falls back below the reference negative pressure, the second electronic vacuum pump 102 is allowed to operate. Furthermore, when the reference negative pressure is satisfied within the maximum time for the second electronic vacuum pump 102 to operate, the second electronic vacuum pump 102 is disallowed to operate. These processes are repeated alternately.

On the other hand, although the first electronic vacuum pump 101 operates for the maximum operating time, but does not generate a negative pressure for disallowance of operation (the reference negative pressure), the EVP controller 110 performs control that stops the operation of the first electronic vacuum pump 101 and operates the second electronic vacuum pump 102 until the negative pressure for disallowance of operation is reached.

In one example, the EVP controller 110 performs alternation control to alternately operate the first electronic vacuum pump 101 and the second electronic vacuum pump 102 until the negative pressure for disallowance of operation (the reference negative pressure) is satisfied.

The EVP controller 110 performs control that causes the first electronic vacuum pump 101 to generate the negative pressure for disallowance of operation, stops the operation of the first electronic vacuum pump 101, and then operates the second electronic vacuum pump 102 in the next operating situation. Conversely, the EVP controller 110 performs control that causes the second electronic vacuum pump 102 to generate the negative pressure for disallowance of operation, stops the operation of the second electronic vacuum pump 102, and then operates the first electronic vacuum pump 101 in the next operating situation.

For example, in a state where the first and second electronic vacuum pumps 101 and 102 are set in such a way that maximum operating time=five seconds and negative pressure for disallowance of operation=600 mmHg. When the first electronic vacuum pump 101 generates a 600 mmHg negative pressure for disallowance of operation in an operating time of four seconds, that is shorter than the maximum operating time of five seconds, the first electronic vacuum pump 101 stops operating when four seconds have elapsed, and the second electronic vacuum pump 102 operates in the next operating situation.

In addition, when the first electronic vacuum pump 101 operates for more than five seconds, that is the maximum operating time, but does not generate the negative pressure of disallowance of operation (the reference negative pressure), the first electronic vacuum pump 101 stops operating after five seconds have elapsed, and the second electronic vacuum pump 102 operates for five seconds until the negative pressure for disallowance of operation is reached. If the second electronic vacuum pump 102 does not generate the negative pressure for disallowance of operation within five seconds as well, the first electronic vacuum pump 101 resumes operating.

In this manner, the alternation control of the first and second electronic vacuum pumps 101 and 102 by the EVP controller 110 can not only easily generate the reference negative pressure, but also contribute to the prevention of excessive temperature of, and an increase in durability of, each of the electronic vacuum pumps 101 and 102.

Example of Controlling the Driving of the First and Second Electronic Vacuum Pumps for Each Vehicle Speed The EVP controller 110 is configured to perform control to drive the first and second electronic vacuum pumps 101 and 102 at a speed in terms of RPM that is set in a manner that varies with each vehicle speed. The EVP controller 110 is configured to perform control to end the driving when the negative pressure generated by driving each of the first and second electronic vacuum pumps 101 and 102 satisfies the reference negative pressure.

In other words, the EVP controller 110 can set the RPM at which the first and second electronic vacuum pumps 101 and 102 operate, in a manner that varies with the vehicle speed (kph), and can set points in time at which the first and second electronic vacuum pumps 101 and 102 stop operating, according to the negative pressures that are generated when the first and second electronic vacuum pumps 101 and 102 operate at the RPM for each vehicle speed. Examples of setting the points in time are illustrated in Table 1.

To this end, when it is determined on the basis of signals of the wheel speed sensor 22 and the negative-pressure sensor 23 that the negative pressure falls below the reference negative pressure due to braking that is applied while the vehicle travels at a cruising speed that is equal to or lower than a fixed speed, the EVP controller 110 performs control that operates the first electronic vacuum pump 101 or the second electronic vacuum pump 102 at the RPM for each vehicle speed, which is set as described above. Thereafter, when the negative pressure reaches the reference negative pressure, the EVP controller 110 performs control that ends the operation of the first electronic vacuum pump 101 or the second electronic vacuum pump 102.

TABLE 1

|  | 20 kph ↓ | 20 ↑ to 50 kph | 50 kph ↑ |
|---|---|---|---|
| Negative Pressure for Operating EVP | 400 mmHg | 500 mmHg | 550 mmHg |
| Negative Pressure for Ending EVP | 600 mmHg | 600 mmHg | 620 mmHg |
| RPM for Operating EVP | 1000 RPM | 2000 RPM | 2000 RPM |

Figure 6:
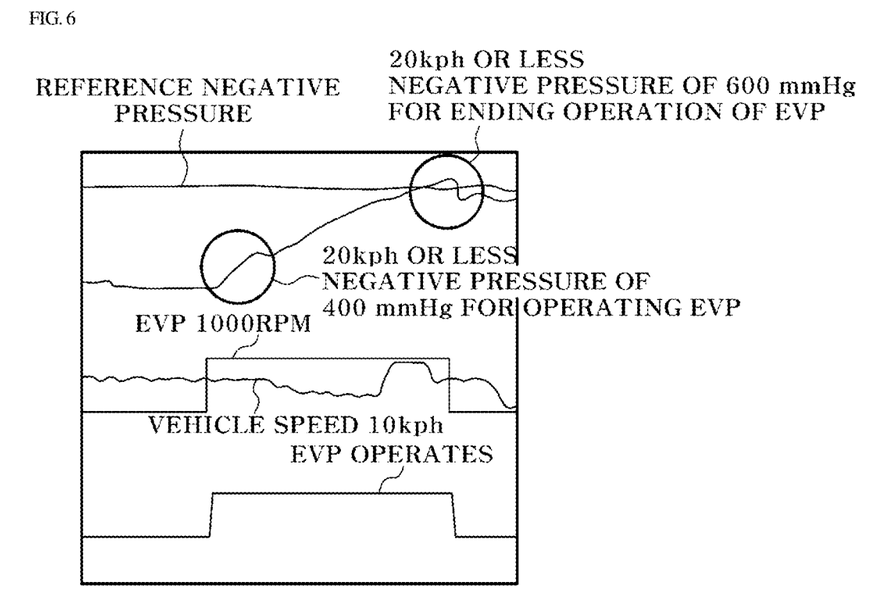

With reference to Table 1 and FIG. 6, when it is determined on the basis of signals of the wheel speed sensor 22 and the negative-pressure sensor 23 that the negative pressure falls to 400 mmHg due to braking that is applied while the vehicle travels at a cruising speed that is equal to or lower than 20 kph, the EVP controller 110 performs control that operates the first electronic vacuum pump 101 or the second electronic vacuum pump 102. Thereafter, when the negative pressure reaches the reference negative pressure of 600 mmHg, the EVP controller 110 performs the control that ends the operation of the first electronic vacuum pump 101 or the second electronic vacuum pump 102.

For example, in a condition that each of the electronic vacuum pumps 101 and 102 operates at 1000 RPM while the vehicle travels at a speed of 20 kph or less and a maximum time for each of the electronic vacuum pumps 101 and 102 to operate is set to 10 seconds, if it takes 8 seconds for the negative pressure to reach 600 mmHg from 400 mmHg, only the first electronic vacuum pump 101 operates for eight seconds. Furthermore, if it takes 12 seconds for the negative pressure to reach 600 mmHg from 400 mmHg, the first electronic vacuum pump 101 operates and then the second electronic vacuum pump 102 operates.

Figure 7:
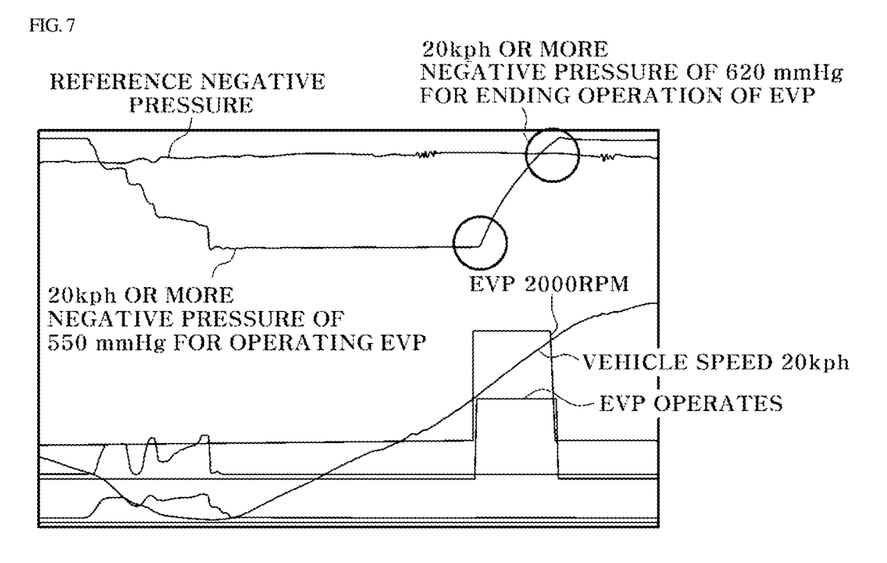

Alternatively, with reference to Table 1 and FIG. 7, when it is determined on the basis of the signals of the wheel speed sensor 22 and the negative-pressure sensor 23 that the negative pressure falls to 550 mmHg due to braking that is applied while the vehicle travels with an acceleration of more than 20 kph, the EVP controller 110 performs control that operates the first electronic vacuum pump 101 or the second electronic vacuum pump 102. Thereafter, when the negative pressure reaches the reference negative pressure of 620 mmHg, the EVP controller 110 performs the control that ends the operation of the first electronic vacuum pump 101 or the second electronic vacuum pump 102.

In this manner, under the control of the EVP controller 110, the first and second electronic vacuum pumps 101 and 102 can be driven at optimal RPM for each vehicle speed, and additionally, the driving of each of the first and second electronic vacuum pumps 101 and 102 can be ended according to a value of the generated negative pressure. This contributes to the prevention of excessive temperature of, and the increase in durability of, each of the electronic vacuum pumps 101 and 102.

Example of Controlling the Concurrent Driving of the First and Second Electronic Vacuum Pumps when the Vehicle Starting Switch is on The EVP controller 110 can apply a concurrent driving control signal to the first and second electronic vacuum pumps 101 and 102 when the vehicle starts and thus can operate the first and second electronic vacuum pumps 101 and 102 together.

To this end, the EVP controller 110 is configured to apply the concurrent driving control signal for concurrent driving to the first and second electronic vacuum pumps 101 and 102 if it is determined on the basis of the signal of the negative-pressure sensor 23 and a starting signal of the I/G signal providing unit 24 that the vehicle starting switch-on situation occurs.

Additionally, the EVP controller 110 is configured to perform control that applies the concurrent driving control signal for concurrent driving to the first and second electronic vacuum pumps 101 and 102, if the negative pressure is equal to or lower than the reference negative pressure when the vehicle starting switch is on, on the basis of the signal of the negative-pressure sensor 23. The EVP controller 110 is configured to perform control that ends the driving when the negative pressure generated by the concurrent driving of the first and second electronic vacuum pumps 101 and 102 satisfies the reference pressure, on the basis of the signal of the negative-pressure sensor 23.

Figure 8:
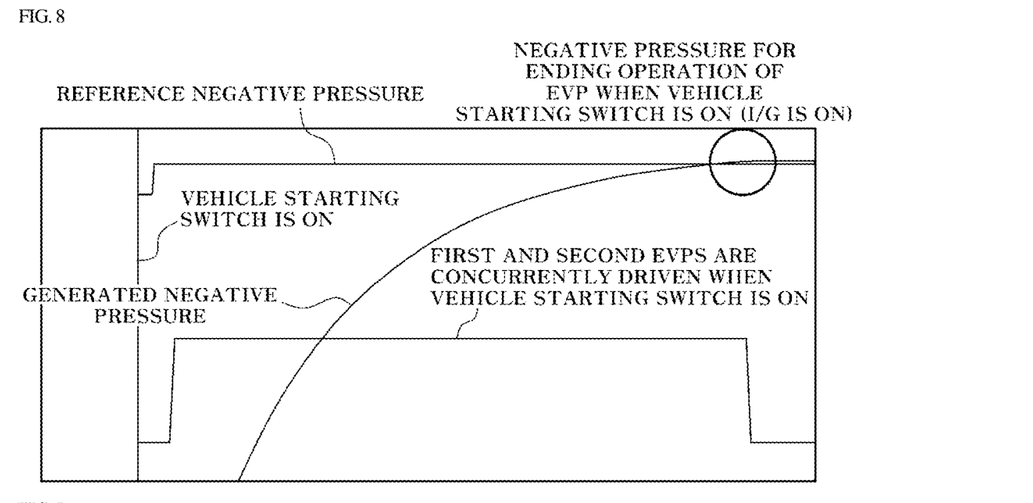

In other words, as illustrated in FIG. 8, if the negative pressure is equal to or lower than the reference negative pressure when the vehicle starting switch is on (I/G ON), with the concurrent driving control signal of the EVP controller 110, the EVP controller 110 performs control that concurrently drives the first and second electronic vacuum pumps 101 and 102. Furthermore, when the negative pressure generated by the concurrent driving of the first and second electronic vacuum pumps 101 and 102 satisfies the reference negative pressure, the EVP controller 110 performs control that ends the driving of the first and second electronic vacuum pumps 101 and 102.

For example, if the negative pressure is 400 mmHg when the vehicle starting switch is on (I/G ON), a negative pressure for ending the operations of the first and second electronic vacuum pumps 101 and 102 is set to 600 mmHg when the vehicle switch is on. In this state, if the negative pressure is 550 mmHg when the vehicle starting switch is on, the EVP controller 110 performs control that does not operate the first and second electronic vacuum pumps 101 and 102. In this state, if the negative pressure is 350 mmHg when the vehicle starting switch is on, the EVP controller 110 performs control that concurrently drives the first and second electronic vacuum pumps 101 and 102 and then, when the generated negative pressure reaches 600 mmHg, ends the operations of the first and second electronic vacuum pumps 101 and 102.

Example of Controlling the Concurrent Driving of the First and Second Electronic Vacuum Pumps when Rapid Deceleration and Sudden Braking Occur For the concurrent driving control of the first and second electronic vacuum pumps 101 and 102 when the rapid deceleration and the sudden braking occur, the EVP controller 110 is configured to apply the concurrent driving control signal for concurrent driving to the first and second electronic vacuum pumps, when it is determined on the basis of the signal of the pressure sensor 21 and the signal of the negative-pressure sensor 23 that the rapid deceleration or the sudden braking occurs.

Specifically, the EVP controller 110 is configured to perform control that determines that the rapid-deceleration or sudden-braking situation occurs, and concurrently drives the first and second electronic vacuum pumps 101 and 102, in a case where a brake hydraulic pressure of a master cylinder 14 is equal to or higher than a predetermined pressure on the basis of the signal of the pressure sensor 21. However, the EVP controller 110 is configured to perform control that ends the driving of the first and second electronic vacuum pumps 101 and 102 when a generation negative pressure generated in the first and second electronic vacuum pumps 101 and 102 reaches a target negative pressure.

Accordingly, in a case where the rapid deceleration or the sudden braking occurs during vehicle traveling, on the basis of the signals of the pressure sensor 21 and the negative-pressure sensor 23, the EVP controller 110 performs the control that concurrently drives the first and second electronic vacuum pumps 101 and 102.

Figure 9:
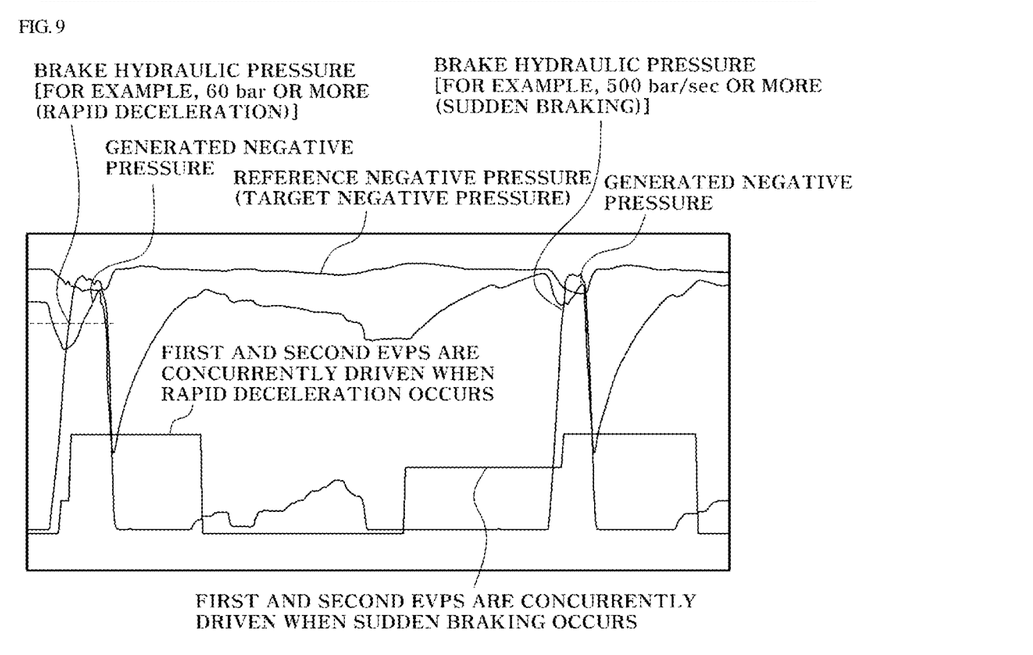

In other words, as illustrated on the left side of FIG. 9, the EVP controller 110 performs control that determines that the rapid deceleration situation occurs, and concurrently drives the first and second electronic vacuum pumps 101 and 102, in a case where a brake hydraulic pressure of the master cylinder 14 is equal to or higher than a predetermined pressure (for example, refer to a portion in FIG. 9 indicating that a brake hydraulic pressure is 60 bar or more) on the basis of the signal of the pressure sensor 21. However, the EVP controller 110 performs control that ends the driving of the first and second electronic vacuum pumps 101 and 102, when the generation negative pressure generated in the first and second electronic vacuum pumps 101 and 102 reaches the target negative pressure.

For example, it is assumed that, in a state where a predetermined pressure of the master cylinder 14 is 60 bar and where the target negative pressure (a negative pressure for ending the operation of the vacuum pump) is set to 600 mmHg, a brake pressure of the master cylinder 14 is 70 bar during actual braking. On this assumption, if a brake pressure of the master cylinder is 70 bar when braking occurs actually, the operations of the first and second electronic vacuum pumps 101 and 102 are ended when the negative pressure generated by concurrently driving the first and second electronic vacuum pumps 101 and 102 reaches the target negative pressure of 600 mmHg.

In addition, as illustrated on the right side of FIG. 9, the EVP controller 110 performs control that determines that the sudden braking situation occurs, and concurrently drives the first and second electronic vacuum pumps 101 and 102, in a case where an ascending slope for the brake hydraulic pressure of the master cylinder 14 is equal to or greater than a predetermined slope (for example, refer to a portion in FIG. 9 indicating that the ascending slope is 500 bar/sec or more) on the basis of the signal of the pressure sensor 21. However, the EVP controller 110 performs the control that ends the driving of the first and second electronic vacuum pumps 101 and 102, when the generation negative pressure generated in the first and second electronic vacuum pumps 101 and 102 reaches the target negative pressure.

In a case where the rapid deceleration or sudden braking occurs in this manner during the vehicle traveling, the control that concurrently drives the first and second electronic vacuum pumps 101 and 102 is performed. Thus, the negative pressure for braking is easy to generate.

Example of Concurrently Driving the First and Second Electronic Vacuum Pumps when the Negative Pressure is Low When the EVP controller 110 performs the control that concurrently drives the first and second electronic vacuum pumps 101 and 102, it is determined on the basis of the signals of the pressure sensor 21 and the negative-pressure sensor 23 that a state where a negative pressure of the booster 12 is a low negative pressure equal to or less than a reference value is reached due to successive brake operation of the brake pedal during the vehicle traveling.

As described above, although the first and second electronic vacuum pumps 101 and 102 are driven alternately, a necessary negative pressure can be generated in the booster 12. However, when a brake pedal stroke is repeated for successive braking, the negative pressure is reduced rapidly. Thus, a state is reached where a speed at which the generation negative pressure is formed in the first electronic vacuum pump 101 or the second electronic vacuum pump 102 is lower than a speed at which the negative pressure is reduced. Because of this, a phenomenon where the stiff feeling of pushing down on the brake pedal can occur. The EVP controller 110 recognizes this state as a low negative pressure situation, on the basis of the signals of the pressure sensor 21 and the low negative-pressure sensor 23.

Figure 10:
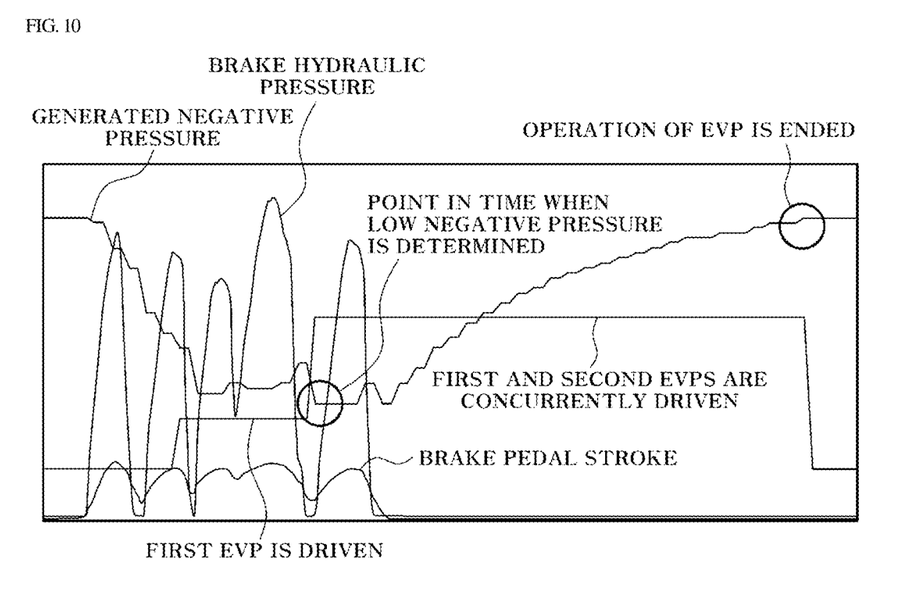

Accordingly, as illustrated in FIG. 10, when it is determined that the negative pressure is low, the EVP controller 110 performs the control that concurrently drives the first and second electronic vacuum pumps 101 and 102, in such a manner that a speed at which the negative pressure is replenished is improved in order to prevent the stiff feeling of pushing down on the brake pedal.

Therefore, the concurrent driving of the first and second electronic vacuum pumps 101 and 102 can quickly generate the negative pressure up to the reference negative pressure (the negative pressure for ending the operation of the EVP), and thus the booster can be replenished with the generated negative pressure.

On the other hand, in a case where operation conditions for the above-described embodiments of controlling the driving of the first and second electronic vacuum pumps are redundant or overlapped, the control that concurrently drives the first and second electronic vacuum pumps is performed.

For example, in a situation where the first and second electronic vacuum pumps are driven alternately, when the low negative-pressure situation, the rapid-deceleration situation, and the like occur and the control that concurrently drives the first and second electronic vacuum pumps is thus performed, as described above, in an overlapping manner, the concurrent driving of the first and second electronic vacuum pumps is performed. When the generation negative pressure that is generated in this manner satisfies the reference negative pressure (the negative pressure for ending the operation), the control that concurrently drives the first and second electronic vacuum pumps is ended.

In a case where a situation of performing the control of the concurrent driving of the first and second electronic vacuum pumps, as described above, occurs in an overlapping manner, the driving of the first and second electronic vacuum pumps is stopped in a manner that satisfies a condition for ending the following control of the concurrent driving.

What is claimed is:

1. A system for controlling driving of an electronic vacuum pump, the system comprises:
    a first electronic vacuum pump and a second electronic vacuum pump, each providing a negative pressure to a booster when an electric vehicle brakes; and
    an electronic vacuum pump (EVP) controller that performs control which alternately or concurrently drives the first electronic vacuum pump and the second electronic vacuum pump on the basis of signals of sensors each of which senses information associated with starting and braking of the electric vehicle,
    wherein the EVP controller is configured to perform control that drives the first and second electronic vacuum pumps at a speed in terms of revolutions per minute (RPM) that is set in a manner that varies with each vehicle speed and to perform control that ends the driving when the negative pressure generated by driving each of the first and second electronic vacuum pumps satisfies a reference negative pressure.

2. The system according to claim 1, wherein the EVP controller is configured to determine conditions for allowing and disallowing the first and second electronic vacuum pumps to operate, on the basis of sensing signals of the sensors, and to apply an alternately-driving signal or a concurrently-driving signal to the first and second electronic vacuum pumps according to the determined conditions.

3. The system according to 1, wherein the sensors are configured to include:
    a pressure sensor that senses an operating pressure of a master cylinder and provides the sensed operating pressure to the EVP controller;
    a wheel speed sensor that detects a vehicle speed and provides the detected vehicle speed to the EVP controller;
    a negative-pressure sensor that senses the negative pressure provided to the booster and provides the sensed negative pressure to the EVP controller; and
    an I/G (ignition) signal providing unit that provides an ignition signal to the EVP controller when the electric vehicle starts.

4. The system according to claim 3, wherein the EVP controller is configured to apply an alternation control signal for alternate driving to the first and second electronic vacuum pumps in a basic vehicle traveling and braking situation other than a vehicle starting switch-on situation, a rapid-deceleration and sudden-braking situation, or a low negative-pressure situation.

5. The system according to claim 3, wherein the EVP controller is configured to apply a concurrent driving control signal for concurrent driving to the first and second electronic vacuum pumps when a vehicle starting switch is on, on the basis of a signal of the negative-pressure sensor and a starting signal of the I/G signal providing unit.

6. The system according to claim 5, wherein the EVP controller is configured to perform control that applies the concurrent driving control signal for concurrent driving to the first and second electronic vacuum pumps if the negative pressure is equal to or lower than the reference negative pressure when the vehicle starting switch is on, on the basis of the signal of the negative-pressure sensor, and to perform control that ends the driving of the first and second electronic vacuum pumps when the negative pressure generated by concurrently driving the first and second electronic vacuum pumps satisfies the reference negative pressure, on the basis of the signal of the negative-pressure sensor.

7. The system according to claim 3, wherein the EVP controller is configured to apply a concurrent driving control signal for concurrent driving to the first and second electronic vacuum pumps when it is determined on the basis of signals of the pressure sensor and the negative-pressure sensor that a rapid deceleration situation or a sudden-braking situation occurs.

8. The system according to claim 7, wherein the EVP controller is configured to perform control that determines that the rapid deceleration situation occurs, when a brake hydraulic pressure of the master cylinder is equal to or higher than a predetermined pressure on the basis of the signal of the pressure sensor, or determines that the sudden-braking situation occurs, when an ascending slope for the brake hydraulic pressure of the master cylinder is equal to or greater than a predetermined slope on the basis of the signal of the pressure sensor, and to perform control that concurrently drives the first and second electronic vacuum pumps, but to perform control that ends the driving of the first and second electronic vacuum pumps, when a generation negative pressure generated in the first and second electronic vacuum pumps reaches a target negative pressure.

9. The system according to claim 3, wherein the EVP controller is configured to perform control that concurrently drives the first and second electronic vacuum pumps, when it is determined on the basis of signals of the pressure sensor and the negative-pressure sensor that a state where the negative pressure of the booster is a low negative pressure equal to or less than a reference value is reached due to successive brake operation of a brake pedal during vehicle traveling.

10. A method of controlling driving of an electronic vacuum pump, the method comprising:
    providing signals of sensors, each sensing information associated with electric starting and braking of an electric vehicle, to an electronic vacuum pump (EVP) controller;
    causing the EVP controller to determine conditions for allowing and disallowing a first electric vacuum pump and a second electric vacuum pump, each providing a negative pressure to a booster, to operate, on the basis of sensing signals of the sensors; and
    causing the EVP controller to perform control that, according to the determined conditions, applies an alternately-driving signal for alternate driving of the first electric vacuum pump and the second electric vacuum pump or applies a concurrently-driving signal for concurrent driving of the first electric vacuum pump and the second electric vacuum pump, wherein in the causing of the EVP controller to performing control, the control is performed to drive the first and second electronic vacuum pumps at a speed in terms of revolutions per minute (RPM) that is set in a manner that varies with each vehicle speed, and the control is performed to end the driving when the negative pressure generated by driving each of the first and second electronic vacuum pumps satisfies a reference negative pressure.

11. The method according to claim 10, wherein the EVP controller is configured to apply an alternation control signal for alternate driving to the first and second electronic vacuum pumps when the determined condition is a basic vehicle traveling and braking situation other than a vehicle starting switch-on situation, a rapid-deceleration and sudden-braking situation, or a low negative-pressure situation.

12. The method according to claim 10, wherein the EVP controller applies a concurrent driving control signal for concurrent driving to the first and second electronic vacuum pumps when the condition determined on the basis of a signal of the negative-pressure sensor and a starting signal of an JIG (ignition) signal providing unit is a vehicle starting switch-on situation.

13. The method according to claim 12, wherein the EVP controller performs control that applies the concurrent driving control signal for concurrent driving to the first and second electronic vacuum pumps when the negative pressure is equal to or lower than the reference negative pressure when a vehicle starting switch is on, on the basis of the signal of the negative-pressure sensor, and performs control that ends the driving of the first and second electronic vacuum pumps when the negative pressure generated by concurrently driving the first and second electronic vacuum pumps satisfies the reference negative pressure, on the basis of the signal of the negative-pressure sensor.

14. The method according to claim 10, wherein the EVP controller applies a concurrent driving control signal for concurrent driving to the first and second electronic vacuum pumps when the condition determined on the basis of signals of a pressure sensor and a negative-pressure sensor is a rapid deceleration situation or a sudden braking situation.

15. The method according to claim 14, wherein the EVP controller performs control that determines that the rapid deceleration situation occurs, when a brake hydraulic pressure of a master cylinder is equal to or higher than a predetermined pressure on the basis of the signal of the pressure sensor, or determines that the sudden-braking situation occurs, when an ascending slope for the brake hydraulic pressure of the master cylinder is equal to or greater than a predetermined slope on the basis of the signal of the pressure sensor, and performs control that concurrently drives the first and second electronic vacuum pumps, but performs control that ends the driving of the first and second electronic vacuum pumps, when a generation negative pressure generated in the first and second electronic vacuum pumps reaches a target negative pressure.

16. The method according to claim 10, wherein the EVP controller performs control that concurrently drives the first and second electronic vacuum pumps, when the condition determined on the basis of signals of a pressure sensor and a negative-pressure sensor is a low negative pressure situation and the low negative pressure is equal to or less than a reference value due to successive brake operation of a brake pedal during vehicle traveling.

17. A method of controlling driving of an electronic vacuum pump, the method comprising:
providing signals of sensors, each sensing information associated with electric starting and braking of an electric vehicle, to an electronic vacuum pump (EVP) controller;
causing the EVP controller to determine conditions for allowing and disallowing a first electric vacuum pump and a second electric vacuum pump, each providing a negative pressure to a booster, to operate, on the basis of sensing signals of the sensors; and
causing the EVP controller to perform control that, according to the determined conditions, applies an alternately-driving signal for alternate driving of the first electric vacuum pump and the second electric vacuum pump or applies a concurrently-driving signal for concurrent driving of the first electric vacuum pump and the second electric vacuum pump,
wherein the EVP controller applies a concurrent driving control signal for concurrent driving to the first and second electronic vacuum pumps when the condition determined on the basis of signals of a pressure sensor and a negative-pressure sensor is a rapid deceleration situation or a sudden braking situation.

* * * * *

UNITED STATES PATENT AND TRADEMARK OFFICE
CERTIFICATE OF CORRECTION

| | | |
|---|---|---|
| PATENT NO. | : 11,332,111 B2 | Page 1 of 1 |
| APPLICATION NO. | : 16/880461 | |
| DATED | : May 17, 2022 | |
| INVENTOR(S) | : Woo Pyeong Seo, Il Young Chang and Eun Bae Koh | |

It is certified that error appears in the above-identified patent and that said Letters Patent is hereby corrected as shown below:

In the Claims

Claim 12, Column 13, Line 25: "JIG" should be replaced with --I/G--

Signed and Sealed this
Second Day of August, 2022

Katherine Kelly Vidal
*Director of the United States Patent and Trademark Office*